(12) United States Patent
Lang (10) Patent No.: US 8,770,453 B2
(45) Date of Patent: Jul. 8, 2014

(54) POWER LOCK ASSEMBLY FOR VEHICLE ROOF RACK

(75) Inventor: Chris Lang, Dublin, OH (US)

(73) Assignee: Honda Motor Co., Ltd., Tokyo (JP)

( * ) Notice: Subject to any disclaimer, the term of this patent is extended or adjusted under 35 U.S.C. 154(b) by 315 days.

(21) Appl. No.: 13/198,262

(22) Filed: Aug. 4, 2011

(65) Prior Publication Data
US 2013/0032619 A1     Feb. 7, 2013

(51) Int. Cl.
*B60R 9/00* (2006.01)

(52) U.S. Cl.
USPC ............................................. 224/315

(58) Field of Classification Search
USPC ............................................. 224/315
See application file for complete search history.

(56) References Cited

U.S. PATENT DOCUMENTS

| | | | |
|---|---|---|---|
| 4,269,339 A * | 5/1981 | Bott .............................. | 224/325 |
| 5,306,156 A * | 4/1994 | Gibbs et al. ................... | 439/34 |
| 5,709,521 A * | 1/1998 | Glass et al. ................... | 414/462 |
| 6,236,307 B1 | 5/2001 | Kurano | |
| 6,761,051 B1 | 7/2004 | Tsai | |
| 7,081,810 B2 * | 7/2006 | Henderson et al. ........... | 340/435 |
| 7,233,245 B2 | 6/2007 | O'Neill | |
| 7,311,341 B2 * | 12/2007 | Coleman et al. .............. | 292/216 |
| 7,382,250 B2 | 6/2008 | Marcelle | |
| 2001/0010429 A1 * | 8/2001 | Jyawook et al. .............. | 292/347 |
| 2004/0119583 A1 | 6/2004 | Linden et al. | |
| 2006/0261109 A1 | 11/2006 | Browne et al. | |
| 2008/0173494 A1 * | 7/2008 | Lang .............................. | 180/289 |
| 2008/0236216 A1 | 10/2008 | Takeuchi et al. | |

* cited by examiner

*Primary Examiner* — Brian D Nash
(74) *Attorney, Agent, or Firm* — Rankin, Hill & Clark LLP (57) ABSTRACT

A power lock assembly for a roof rack of a vehicle for releasably securing a valuable to the roof rack includes a lock mechanism and a shackle. The lock mechanism is fixedly connected to the roof rack, and is operable in a locked state and an unlocked state. The shackle is adapted to be releasably secured to the lock mechanism, and engages the valuable on the roof rack. The lock mechanism is electrically connected with a vehicle locking system for locking and unlocking a vehicle door, whereby locking the vehicle door places the lock mechanism in the locked state and unlocking the vehicle door places the lock mechanism in the unlocked state.

16 Claims, 7 Drawing Sheets

POWER LOCK ASSEMBLY FOR VEHICLE ROOF RACK

BACKGROUND

Exemplary embodiments herein generally relate to a vehicle roof rack, and, more particularly, relate to a power lock assembly for a vehicle roof rack that is operably associated with a power door lock signal for locking and unlocking a vehicle door.

Current vehicle roof racks are mounted to a vehicle body and require a separate lock mechanism in order to lock and secure any valuables to the roof rack. These lock mechanisms are typically releasably mounted to the roof racks and generally have exclusive keys that are different from the keys to enter and start the vehicle. As such, it is oftentimes inconvenient for an operator to track multiple keys for different accessories, and in certain instances, insertion of the key into a keyhole of the lock mechanism can be difficult or inconvenient to conduct.

BRIEF DESCRIPTION

In accordance with one aspect, a power lock assembly for a roof rack of a vehicle for releasably securing a valuable to the roof rack comprises a lock mechanism and a shackle. The lock mechanism is fixedly connected to the roof rack, and is operable in a locked state and an unlocked state. The shackle is adapted to be releasably secured to the lock mechanism, and engages the valuable on the roof rack. The lock mechanism is electrically connected with a vehicle locking system for locking and unlocking a vehicle door. Locking the vehicle door places the lock mechanism in the locked state to lock/secure the valuable to the roof rack via the shackle and unlocking the vehicle door places the lock mechanism in the unlocked state.

In accordance with another aspect, a roof rack for a vehicle comprises a first side rail, a second side rail spaced from the first side rail, and a power lock assembly. The power lock assembly includes a lock mechanism fixedly mounted to one of the first and second side rails. The lock mechanism is operable in a locked state and an unlocked state based on a state of a power door lock for a vehicle door. A shackle has end portions adapted to be releasably secured to the lock mechanism. The lock mechanism is in the locked state when the power door lock is in a locked state, and the lock mechanism is in the unlocked state when the power door lock is in an unlocked state.

In accordance with yet another aspect, a method of actuating a power lock assembly provided on a roof rack of a vehicle is also provided. The method comprises receiving by the power door lock assembly a power door lock signal from a vehicle locking system, and actuating the lock mechanism of the power lock assembly in response to the received power door lock signal such that a locked state or unlocked state of the lock mechanism and a locked state or unlocked state of the vehicle locking system are alike.

DETAILED DESCRIPTION

It should, of course, be understood that the description and drawings herein are merely illustrative and that various modifications and changes can be made in the structures disclosed without departing from the present disclosure. It will also be appreciated that the various identified components of the exemplary power lock assembly for a vehicle roof rack disclosed herein are merely terms of art that may vary from one manufacturer to another and should not be deemed to limit the present disclosure.

Figure 1:
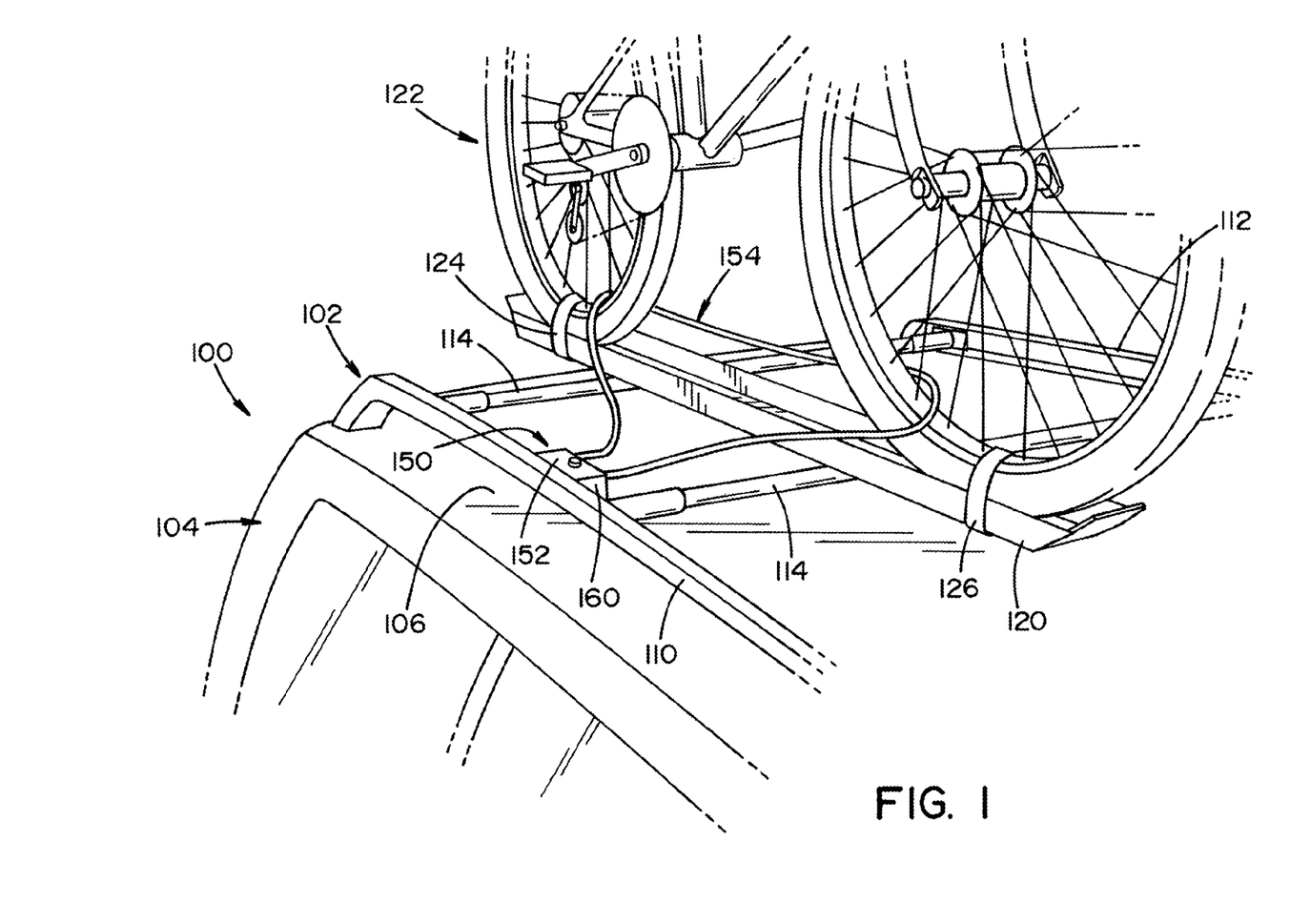
FIG. 1 schematically illustrates a vehicle having an exemplary roof rack mounted to a vehicle roof, the roof rack including an exemplary power lock assembly.

Referring now to the drawings, wherein like numerals refer to like parts throughout the several views, FIG. 1 schematically illustrates a vehicle 100 having an exemplary roof rack 102 mounted to a vehicle body 104, particularly a vehicle roof 106. The depicted roof rack 102 includes a first side rail 110 and a second side rail 112, which is spaced transversely apart from the first side rail. Each side rail 110,112 extends lengthwise on the vehicle roof 106. In the illustrated embodiment, at least one transverse rail 114 spans between and is secured to the first and second side rails 110,112; although, this is not required. A separate bicycle rack 120 can be mounted to the roof rack 102. As depicted, a bicycle 122 is secured to the bicycle rack 120 via straps 124,126. An exemplary power lock assembly 150 is provided on the roof rack 102 for releasably securing a valuable, such as the bicycle 122, to the roof rack 102. It should be appreciated that the bicycle rack 120 and bicycle 122 are by way of example only and that the exemplary lock assembly 150 can be used to secure other valuables to the roof rack 102. As will be discussed in greater detail below, the power lock assembly 150 comprises a lock mechanism 152 and a shackle 154. The lock mechanism 152 is connected to the roof rack 102, and is operable in a locked state and an unlocked state. The shackle 154 is adapted to be releasably secured to the lock mechanism 152, and engages the valuable located on the roof rack 102.

Figure 2:
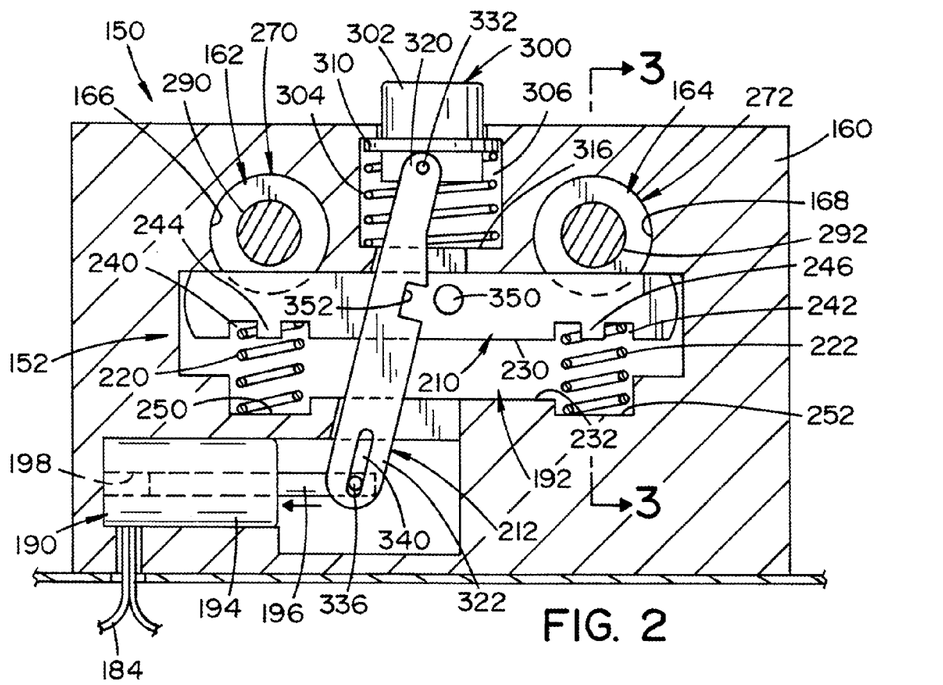
FIG. 2 is a cross-sectional view of the power lock assembly of FIG. 1, the power lock assembly including a lock mechanism and a shackle. The exemplary lock mechanism has a lock drive, a latch assembly and a push button, and is shown in a locked state.
Figure 3:
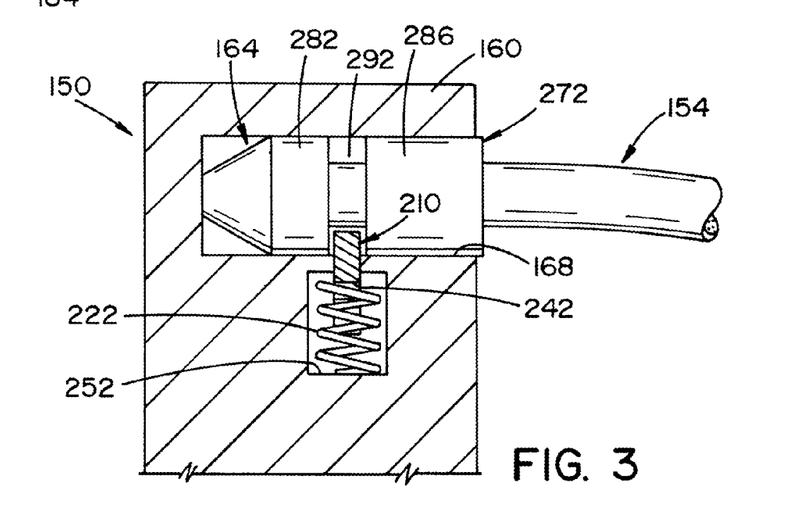
FIG. 3 is a cross-sectional view of the power lock assembly of FIG. 2 taken along line 3-3 of FIG. 2.
Figure 9:
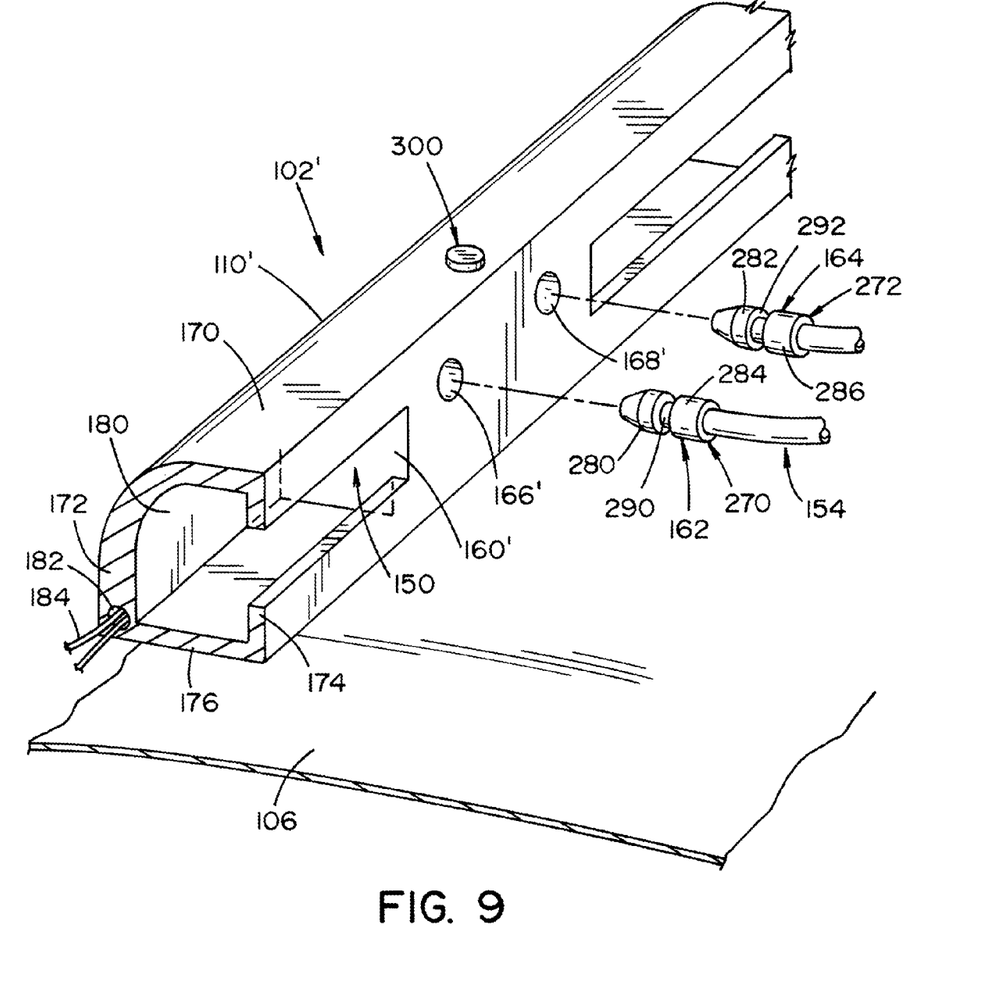
FIG. 9 schematically illustrates a rail of another exemplary roof rack including the exemplary power lock assembly integrally formed with the rail.

With reference to FIGS. 2 and 3, the exemplary power lock assembly 150 includes a housing 160 fixedly mounted to the roof rack 102 for housing the lock mechanism 152 and end portions 162,164 of the shackle 154 in the locked state of the lock mechanism. The shackle end portions 162,164 are inserted into respective openings 166,168 located in the housing 160. According to one aspect of the present disclosure, the housing 160 is connected to an outer surface the side rail 110 (FIG. 1); although, it should be appreciated that the housing 160 can be connected to side rail 112 or the transverse rail 114, if provided on the roof rack. According to another aspect of the present disclosure, a housing 160' (FIG. 9) of the power lock assembly can be integrally formed with a roof rack 102'. Particularly, as shown in FIG. 9, a side rail 110' of the roof rack 102' includes a top wall 170, side walls 172,174 and a bottom wall 176. The walls of the side rail 110' define a channel 180, which can extend lengthwise through the side rail. The housing 160' is located within the channel 180. The side wall 174, which partially defines the housing 160', includes openings 166',168' for receiving the end portions 162,164 of the shackle 154. A bore 182 can be provided in the side wall 172 and wires 184 can be threaded through the bore for providing power to the power lock assembly 150.

The lock mechanism 152 includes a lock drive, e.g. a motor or solenoid, 190 and a latch assembly 192 operably connected to the lock drive. The lock drive 192 is mounted in the housing 160 and is connected electrically to a vehicle power source, such as a vehicle battery 200 (FIG. 5), which provides power to the lock drive via wires 184. However, it should be appreciated that power to the lock drive 190 can be provided from a separate power source, such as a battery, provided within the housing 160. The lock drive 190 includes a housing 194 and a drive member or arm 196 which is telescopically received in a bore 198 provided in the housing. Actuation of the lock drive 190 moves the arm 196 from the position shown in FIG. 2 (the locked state of the lock mechanism 152) to the position shown in FIG. 5 (the unlocked state of the lock mechanism 152).

With reference again to FIG. 2, the latch assembly 192 includes a lock member 210 adapted to selectively engage the shackle 154, and a rocker member 212 adapted to engage the lock member 210 in the unlocked state of the lock mechanism 152. Each of the lock member 210 and rocker member 212 has a locked position (FIG. 2) and an unlocked position (FIG. 7), which correspond to the operating state of the lock mechanism 152. The lock member 210 is normally biased toward its lock position via at least one biasing member. In the depicted exemplary embodiment, the at least one biasing member includes a pair of compression springs 220,222. Each compression spring 220,222 is positioned between a bottom wall 230 of the lock member 210 and a shelf 232 provided in the housing 160. More particularly, the bottom wall 230 of the lock member 210 includes spaced apart recesses 240,242, each recess having a respective projection 244,246. The shelf 232 can also include a pair of recesses 250,252, recess 250 being aligned with recess 240 and recess 252 being aligned with recess 242. Spring 220 has one end portion positioned in recess 240 and mounted on the projection 244 and the other end portion positioned in recess 250. Spring 222 has one end portion positioned in recess 242 and mounted on the projection 246 and the other end portion positioned in recess 252.

As indicated previously, in the locked state of the lock mechanism 152, the end portions 162,164 of the shackle 154 are engaged by the lock member 210. As shown in FIGS. 3 and 9, and according to one aspect, the shackle 154 is a flexible cable. Each end portion 162,164 of the cable includes a respective connector 270,272 which is inserted into the opening 166,168 located on the lock mechanism 152. Each connector 270,272 includes a respective first member 280, 282 and a respective second member 284,286, which is spaced from the first member to form a respective notch 290,292 therebetween. The ends of the first members 280,282 are generally conical shaped. This allows each connector 270,272 to push down the lock member 210 as the connector is inserted into one of the openings 166,168. The lock member 210 then moves back to its locked position when notch 190,192 is positioned over the lock member 210. In the locked state of the lock mechanism 152, the notches 290,292 are engaged by the lock member 210 thereby preventing the end portions 162,164 of the shackle 154 from being released from the lock mechanism 152. It should be appreciated that alternative configurations for the shackle 154 are contemplated. For example, according to another aspect, the shackle 154 can be a U-shaped metal bar having locking notches provided on end portions of the bar, the end portions being engaged by the lock mechanism 152 in a manner similar to that described above.

Figure 7:
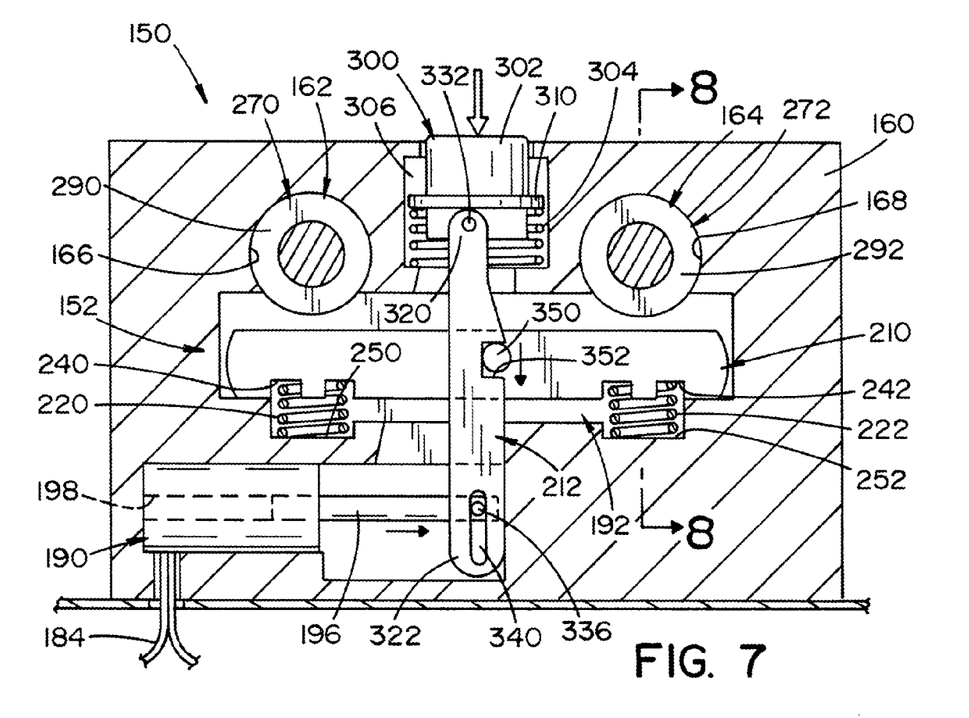
FIG. 7 is a cross-sectional view of the power lock assembly of FIG. 5 showing depression of the push button while in the unlocked state.
Figure 8:
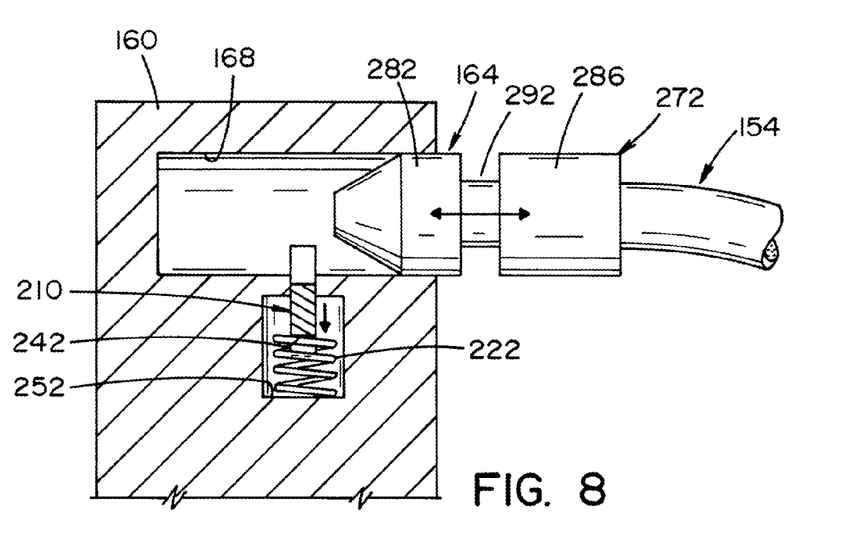
FIG. 8 is a cross-sectional view of the power lock assembly of FIG. 7 taken along line 8-8 of FIG. 7.

With reference back to FIG. 2, the latch assembly 192 further includes a push button 300 operably connected to the rocker member 212. As depicted, the push button includes a cap member 302 and a biasing member, such as a compression spring 304, for biasing the cap member outwardly from an opening 306 provided in the housing 160. To moveably secure the cap member 302 within the opening 306, the cap member 302 includes a ledge 310 which abuts against a portion of the housing 160. To secure the spring 304 to the cap member 302, one end portion of the spring is mounted to the cap member 302 and is engaged by the ledge 310. The other end portion of the spring 304 engages a bottom surface 316, which at least partially defines the opening 306. Depending on the configuration of the roof rack, the push button projects at least partially from one of the housing 160 (FIG. 1) and the side rail 110' (FIG. 9). As will be discussed below, and as shown in FIG. 7, in the unlocked state of the lock mechanism 152, depression of the push button 300 allows the shackle 154 to be disengaged from the lock mechanism 152.

Figure 4:
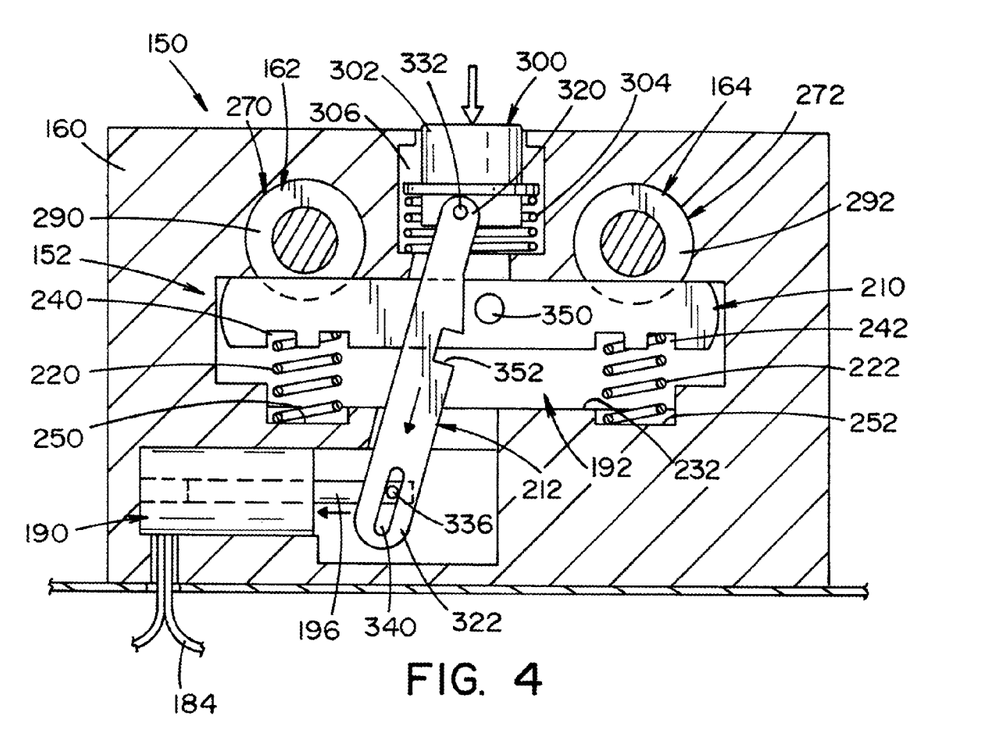
FIG. 4 is a cross-sectional view of the power lock assembly of FIG. 2 showing depression of the push button while in the locked state.

The rocker member 212 includes a first end portion 320 pivotally connected to the cap member 302 of the push button 300 and a second end portion 322 connected to the arm 196 of the lock drive 190. In the depicted exemplary embodiment of FIG. 6, the cap member 302 includes a notch or cutout 330 located below the ledge 310. A pin 332 is located in the cutout 330. The first end portion 320 of the rocker member 212 is mounted on the pin 332, which defines a rotational axis for the rocker member 212. The arm 196 of the lock drive 190 includes a pin 336. The second end portion 332 of the rocker member 212 includes a slot 340 dimensioned to slidably receive the pin 336. As shown in FIG. 4, the slot 340 allows the push button 300 to be depressed when the lock mechanism 152 is the locked state without releasing the shackle 154 from the lock mechanism 152. It should be appreciated that alternative manners for connecting the rocker member 212 to the lock drive 190 and push button 300 are contemplated. Actuation of the lock drive 190 pivots the rocker member 212 about the pin 332 from its locked position (FIG. 2) to its unlocked position (FIG. 5).

As depicted in FIGS. 2 and 4, in the locked state of the lock mechanism 152, the arm 196 of the lock drive 190 is in a retracted position and the lock member 210 is engaged with the shackle 154. When the arm 196 is in the retracted position, the rocker member 212 is pivoted toward the lock drive 190. Depression of the push button 300 moves the rocker member 212 downwardly on the pin 336. As depicted in FIGS. 5 and 7, in the unlocked state of the lock mechanism 152, the arm 196 is in an extended position. This pivots the rocker member 212 into selective engagement with the lock member 210. To allow for this engagement, in the illustrated exemplary embodiment, the lock member 210 includes a projection 350 and the rocker member 212 includes a notch 352 dimensioned to receive the projection 350 as the lock mechanism 152 is moved from the locked state to the unlocked state. Although, alternative manners for engaging the rocker member 212 to the lock member 210 are contemplated. Once engaged, depression of the push button 300 moves the rocker member 212 together with the lock member 210 downwardly allowing the end portions 162,164 of the shackle 154 to be withdrawn from the openings 166,168 of the housing 160. Upon release of the push button 300, the springs 220,222 move the lock member 210 back to its locked position and the spring 304 moves the cap member 302 back to is normal position.

Figure 5:
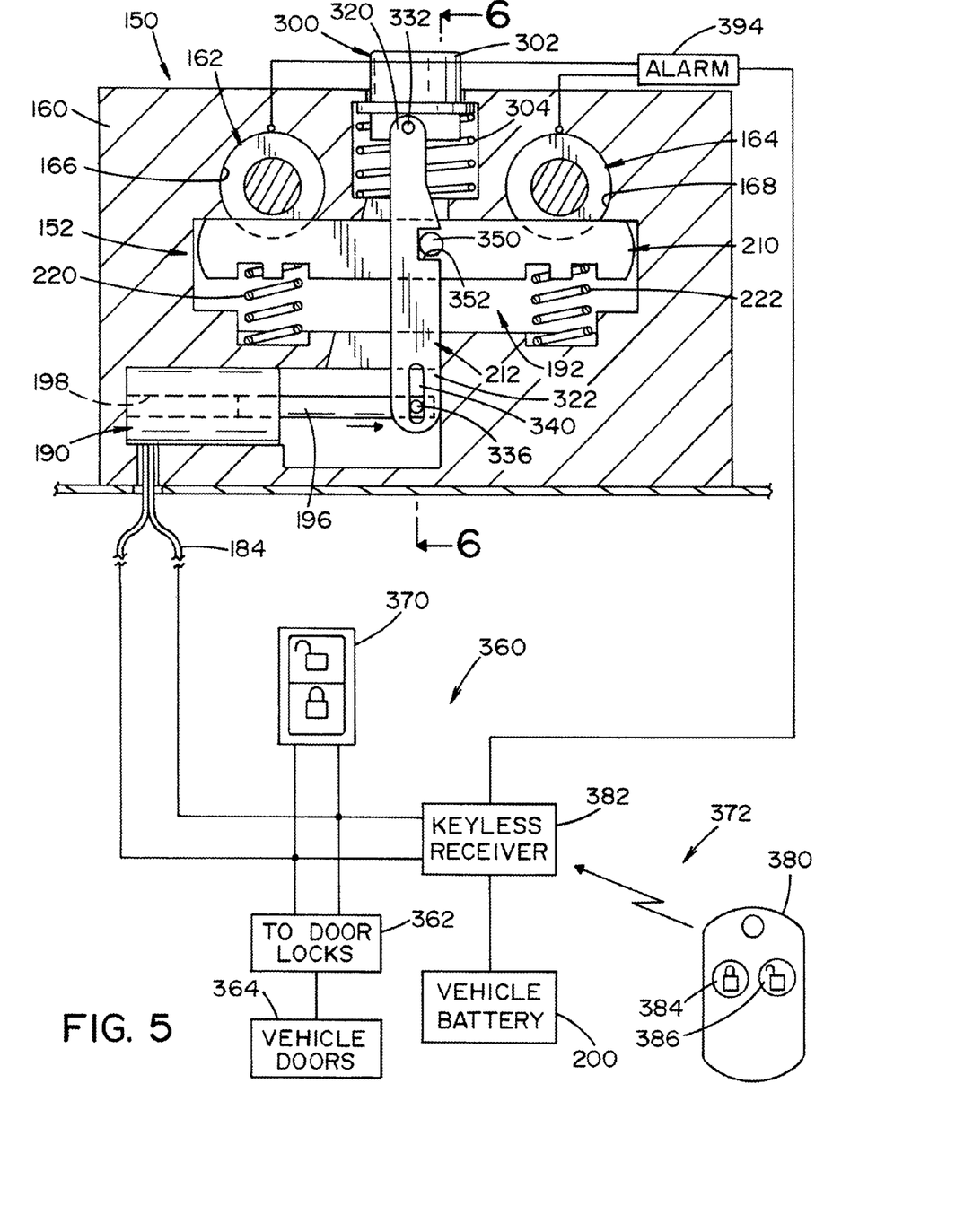
FIG. 5 is a cross-sectional view of the power lock assembly of FIG. 1, in combination with a schematic depiction of a vehicle locking system for locking and unlocking a power door lock for a vehicle door. The lock mechanism is in an unlocked state.
Figure 6:
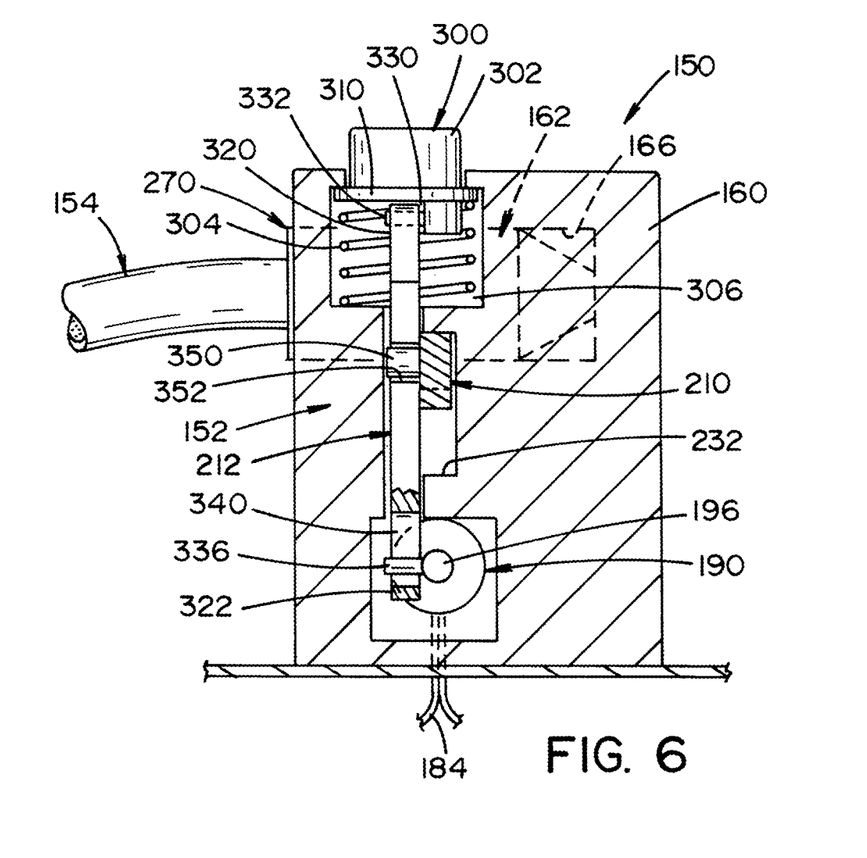
FIG. 6 is a cross-sectional view of the power lock assembly of FIG. 5 taken along line 6-6 of FIG. 5.

With particular reference to FIG. 5, the lock mechanism 152 is electrically connected with a vehicle locking system 360. The vehicle locking system 360 is configured to lock and unlock a power door lock 362 of a vehicle door 364, such as a passenger door, that is connected to the vehicle body 104. As is well known, the locking system 360 is provided with input activation devices which are operable in response to user inputs for activation of the power door lock 362. The devices include at least one power door lock switch 370 provided within the passenger compartment for activation of the power door lock 362, as well as a remote keyless entry (RKE) system 372. The switch 370 and the RKE system 372 are operable to move the power door lock 362 of the vehicle door 364 between a locked state and an unlocked state.

The RKE system 372 is a vehicle convenience accessory that is intended to allow a user to avoid having to manually operate a key in a mechanical lock mechanism to open the vehicle door 364 by enabling the user to remotely access a vehicle from a short distance away from the vehicle. The RKE system 372 generally includes a remote transmitter 380 and a receiver 382 located on the vehicle. The transmitter 380 is usually packaged in a small, hand-held key fob, but can also be a cellular phone, PDA or other electronic device. The fob (as shown in FIG. 5) or other alternative electric device includes actuation buttons, such as a door lock button 384 and a door unlock button 386. With such an alternative electronic device, the actuation buttons may be incorporated into already existing keys or buttons, such as the number buttons on a phone, or can be added as separately functioning buttons. The transmitter 380 is structured and configured to wirelessly communicate an electric signal to the receiver 382. Interface between the transmitter 380 and the receiver 382 can be by radio frequency (RF) transmissions. Of course, the transmission signal can be at other conventionally used frequencies, such as the infrared, as one example. The receiver 382 is structured and configured to enable operation of the power door lock 362 in response to the electric power door lock signal received from the transmitter 380.

With the lock mechanism 152 of the power lock assembly 150 being electrically connected to the vehicle locking system 360, as shown in FIG. 5, the lock mechanism 152 is also configured to receive the power door lock signal from operation of either the power door lock switch 370 or the RKE system 372. The locked and unlocked state of the lock mechanism 152 and the locked and unlocked state of the power door lock 362 are alike. Thus, locking the vehicle door 364 places the lock mechanism 152 in the locked state and unlocking the vehicle door 364 places the lock mechanism in the unlocked state. Specifically, actuation of the switch 370 to lock or unlock the vehicle door 364 can place the lock mechanism 152 in the corresponding locked state or unlocked state. The receiver 382 is also configured to enable operation of the lock mechanism 152 in response to the electric signal received from the transmitter 380. The latch mechanism 152 moves from one of the locked state and unlocked state to the other of the locked state and unlocked state based on receiving the signal from the receiver 382. Therefore, the operating state of the lock mechanism 152 can be dependent upon the operating state of the power door lock 362.

It should also be appreciated that a separate receiver can be provided in the housing 160 of the power lock assembly 150, the receiver being electrically connected to the lock drive 190 and the vehicle battery 200. The remote transmitter 380 can be configured to wirelessly communicate an electric signal to this integrated receiver, and in response to the received signal, the receiver actuates the lock drive 190 to change the operating state of the lock mechanism 152. For example, the transmitter 380 can include a separate actuation button for the power lock assembly 150. Actuation of the separate actuation button on the transmitter 380 sends the electric signal to the integrated receiver of the power lock assembly 150.

With continued reference to FIG. 5, an alarm 394 can be provided which alerts the user of tampering with the lock mechanism 152. The alarm 394 can be electrically connected to the vehicle locking system 360 such that the alarm 394 is activated when the power door lock 362 is in the locked state and the alarm is deactivated when the power door lock 362 is in the unlocked state. The alarm 394 can include, for example, a sensor adapted to determine if one of the end portions 162,164 of the shackle 154 is removed from the lock mechanism 152 while the lock mechanism is in the locked state. The sensor can also be adapted to determine if the shackle 154 is cut. For example, a small electric current can flow through the shackle 154 in the locked state. The sensor can monitor this current and, if the current is broken, the alarm 394 will be activated. The alarm 394 can include, for example, a sound generator capable of generating an audible signal that notifies bystanders and the rightful owner, if in range, that the power lock assembly 150 is being tampered with. The alarm 394 may also be set-up to provide notice to the user or some other specified location through long distance communication, such as a cellular call. The notification can be received on the remote transmitter 380 or any other device, such as, for example, a cellular phone or computer. Such remote alarms may also provide an alarm reset button that can be transmitted back to the vehicle locking system 360, such as, for example, an alarm actuation button on the transmitter 380.

A method of actuating the power lock assembly 150 provided on the roof rack 102 of the vehicle is also provided. The method comprises receiving by the power door lock assembly 150 a power door lock signal from the vehicle locking system 360, and actuating the lock mechanism 152 of the power lock assembly 150 in response to the received power door lock signal such that a locked state or unlocked state of the lock mechanism 152 and a locked state or unlocked state of the vehicle locking system 360 are alike. The method further comprises configuring the operating state of the lock mechanism 152 to be dependent upon the operating state of the vehicle locking system 360.

As is evident from the foregoing, the present disclosure provides the power lock assembly 150 for the roof rack 102 having the lock mechanism 152 that is operably connected to the power door lock signal. The shackle 154 is provided for securing the valuable placed on the roof rack. When the door locks are activated (by the power lock switch 370 or the transmitter 380), the lock mechanism 152 on the roof rack 102 locks the shackle 154 in place and prevents the shackle from being removed. The operating state of the lock mechanism 152 is dependent on the operating state of the power door lock 362. Therefore, by using the lock signal for the power door lock 362, the user can secure any valuable on the roof rack 102 without the need for additional keys. It should also be appreciated that other locking mechanisms can be used with the power lock assembly 150 to accomplish the same function as lock mechanism 152. For example, it is contemplated that a lock mechanism can be provided for the power lock assembly 150 that does not require a separate push button to release the shackle 154. These other such locking mechanisms are intended to be covered within the scope of this application.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A power lock assembly for a roof rack of a vehicle for releasably securing a valuable to the roof rack, the power lock assembly comprising:
a lock mechanism fixedly connected to the roof rack, the lock mechanism operable in a locked state and an unlocked state; and
a shackle adapted to be releasably secured to the lock mechanism, the shackle engaging the valuable on the roof rack,
wherein the lock mechanism is electrically connected with a vehicle locking system for locking and unlocking a vehicle door, locking the vehicle door places the lock mechanism in the locked state to lock/secure the valuable to the roof rack via the shackle, and unlocking the vehicle door places the lock mechanism in the unlocked state,
wherein the lock mechanism includes:
a lock drive electrically connected to the vehicle locking system; and
a latch assembly operably connected to the lock drive, the latch assembly including a biasing member for biasing a lock member toward its locked position.

2. The power lock assembly of claim 1, wherein the latch assembly includes:
a lock member adapted to selectively engage the shackle; and
a rocker member adapted to engage the lock member in the unlocked state, each of the lock member and rocker member having a locked position and an unlocked position.

3. The power lock assembly of claim 2, wherein the latch assembly further includes:
a push button operably connected to the rocker member, in the unlocked state of the lock mechanism depression of the push button allowing the shackle to be disengaged from the lock mechanism.

4. The power lock assembly of claim 3, wherein the rocker member includes:
a first end portion pivotally connected to the push button; and
a second end portion connected to the lock drive, actuation of the lock drive pivoting the rocker member from its locked position to the unlocked position.

5. The power lock assembly of claim 2, wherein the lock member includes:
a projection; and
the rocker member includes a notch dimensioned to receive the projection as the lock mechanism is moved from the locked state to the unlocked state.

6. The power lock assembly of claim 1 in combination with the vehicle locking system, wherein the vehicle locking system includes:
a power door lock switch; and
a remote keyless entry system operable to move a power door lock of the vehicle door between a locked state and an unlocked state, the state of the lock mechanism being dependent on the state of the power door lock.

7. The combination of claim 6, further comprising:
an alarm adapted to alert a user of tampering with lock mechanism, the alarm being electrically connected to the vehicle locking system such that the alarm is activated when the power door lock is in the locked state and the alarm is deactivated when the power door lock is in the unlocked state.

8. The combination of claim 6, wherein the remote keyless entry system comprises:
a remote transmitter, and
a receiver, the transmitter configured to wirelessly communicate an electric signal to the receiver, the receiver configured to enable operation of the lock mechanism in response to the electric signal received from the transmitter, the latch mechanism moving from one of the locked state and unlocked state to the other of the locked state and unlocked state based on receiving the signal.

9. The combination of claim 8, further comprising a key fob, wherein the remote receiver is in the key fob.

10. The power lock assembly of claim 1 in combination with the vehicle roof rack, the roof rack including a rail, the power lock assembly including housing integrally formed with the rail.

11. The combination of claim 10, wherein the rail defines a channel, the housing being located within the channel.

12. A roof rack for a vehicle comprising:
a first side rail and a second side rail spaced from the first side rail; and
a power lock assembly, the power lock assembly including:
a lock mechanism fixedly mounted to one of the first and second side rails, the lock mechanism operable in a locked state and an unlocked state based on a state of a power door lock for a vehicle door,
a shackle having end portions adapted to be releasably secured to the lock mechanism, wherein the lock mechanism is in the locked state when the power door lock is in a locked state and the lock mechanism is in the unlocked state when the power door lock is in an unlocked state,
a lock drive and a latch assembly, the latch assembly including a lock member adapted to selectively engage the shackle and a rocker member adapted to engage the lock member in the unlocked state, the rocker member includes an end portion connected to the lock drive, actuation of the lock drive automatically pivoting the rocker member into engagement with the lock member.

13. The roof rack assembly of claim 12, wherein the power lock assembly includes:
a housing,
the lock drive and latch assembly housed within the housing; and
a push button operably connected to the latch assembly for moving the lock mechanism to the unlocked state, depression of the push button allowing the shackle to be disengaged from the lock mechanism.

14. The roof rack assembly of claim 13, wherein the push button is operably connected to the rocker member.

15. The roof rack assembly of claim 14, wherein the rocker member includes:
a first end portion pivotally connected to the push button; and a second end portion connected to the lock drive, the lock member including a projection and the rocker member includes a notch dimensioned to receive the projection.

16. The roof rack assembly of claim 12 in combination with the vehicle locking system, wherein the vehicle locking system includes:

a power door lock switch; and a remote keyless entry system operable to move the power door lock of the vehicle door between a locked state and an unlocked state, the remote keyless entry system including:

a remote transmitter, and a receiver, the transmitter configured to wirelessly communicate an electric signal to the receiver, the receiver configured to enable operation of the lock mechanism in response to receiving the electric signal from the transmitter, the latch mechanism moving from one of the locked state and unlocked state to the other of the locked state and unlocked state based on receiving the signal.

* * * * *